United States Patent
Wheeler

[19]

[11] Patent Number: 6,038,939
[45] Date of Patent: Mar. 21, 2000

[54] MODULAR SINGLE LEVER ASSEMBLY FOR SHIFTING A VEHICLE TRANSMISSION

[75] Inventor: Douglas J. Wheeler, Farmington Hills, Mich.

[73] Assignee: Teleflex Incorporated, Plymouth Meeting, Pa.

[21] Appl. No.: 09/104,526

[22] Filed: Jun. 25, 1998

[51] Int. Cl.[7] .......................... F16H 59/02; B60K 20/04
[52] U.S. Cl. .................. 74/473.3; 74/473.1; 74/473.23; 74/538
[58] Field of Search ................. 74/473.1, 473.3, 74/FOR 100, 501.6, 523, 538, 473.23, 491

[56] References Cited

U.S. PATENT DOCUMENTS

| | | |
|---|---|---|
| 4,474,085 | 10/1984 | DeVogelaere et al. . |
| 5,207,124 | 5/1993 | Anderson et al. . |
| 5,277,077 | 1/1994 | Osborn ................................. 74/473.28 |
| 5,309,783 | 5/1994 | Doolittle et al. . |
| 5,400,673 | 3/1995 | Brock . |
| 5,435,424 | 7/1995 | Murakami et al. ................... 74/473.28 |
| 5,560,253 | 10/1996 | Ishikawa et al. ...................... 74/473.3 |
| 5,791,197 | 8/1998 | Rempinski et al. ................... 74/473.3 |
| 5,904,069 | 5/1999 | Rau et al. ............................. 74/473.14 |

FOREIGN PATENT DOCUMENTS 57-196326  12/1982  Japan .

*Primary Examiner*—David A. Bucci
*Assistant Examiner*—William C Joyce
*Attorney, Agent, or Firm*—Howard & Howard

[57] ABSTRACT

A modular single lever control which shares common components consisting of plastic can be heat fused and or snapped together. A common base component (12) has opening (22) which receive male projections (20) from side components (14 and 16). In addition, cantilevered male projections (24) extend laterally from side components (14 and 16) and into overlapping portions with the snap-together connections (26) disposed in the overlapping portions for holding the side components (14 and 16) together. The detent side component (14) includes detents (44) to coact with a detent roller (58). Alternatively (144) are presented in a flange extending from the centrally disposed lever subassembly (18) to coact with a roller (158) supported from the second side component (16). A pair of opposing stub shafts (28) extend in a cantilevered fashion from lower bridge (36) of the side components for rotatably supporting the single lever subassembly (18).

24 Claims, 5 Drawing Sheets

6,038,939

MODULAR SINGLE LEVER ASSEMBLY FOR SHIFTING A VEHICLE TRANSMISSION

BACKGROUND OF THE INVENTION

1. Field of the Invention

The subject invention relates to a single lever control for shifting the transmission of a vehicle and, more specifically, to such an assembly which is easily assembled.

2. Description of the Prior Art

Vehicle transmission shifters normally comprise a base and a variety of parts which are individually assembled in various operations. Such assemblies typically consist of metal with the components welded together and/or connected together with fasteners. Still further, the shifter assemblies are each dedicated to a particular model of vehicle, thereby requiring separate tooling for each model. An example of a prior assembly directed toward overcoming some of the problems is disclosed in U.S. Pat. No. 5,400,673 to Brock. It is also well known to make the components of plastic materials as evidenced by U.S. Pat. No. 5,207,124 to Anderson et al and U.S. Pat. No. 5,309,783 to Doolittle et al.

SUMMARY OF THE INVENTION AND ADVANTAGES

A modular single lever shift assembly comprising a base component for attachment to a vehicle, a first side component extending from the base, and a second side component extending from the base and spaced from the first side component. A lever subassembly is pivotally supported between the side components for pivotal movement between shift positions. The assembly is characterized by integral connections for connecting the components together.

Accordingly, the subject invention may be assembled without the need of fasteners and the labor required to attach the fasteners. The components may consist of organic polymeric material which are fused together with heat and/or snap together with male and female connections. Some of the components are universal for use in more than one shifter assembly; i.e., universal components for shifters for different vehicle models.

DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
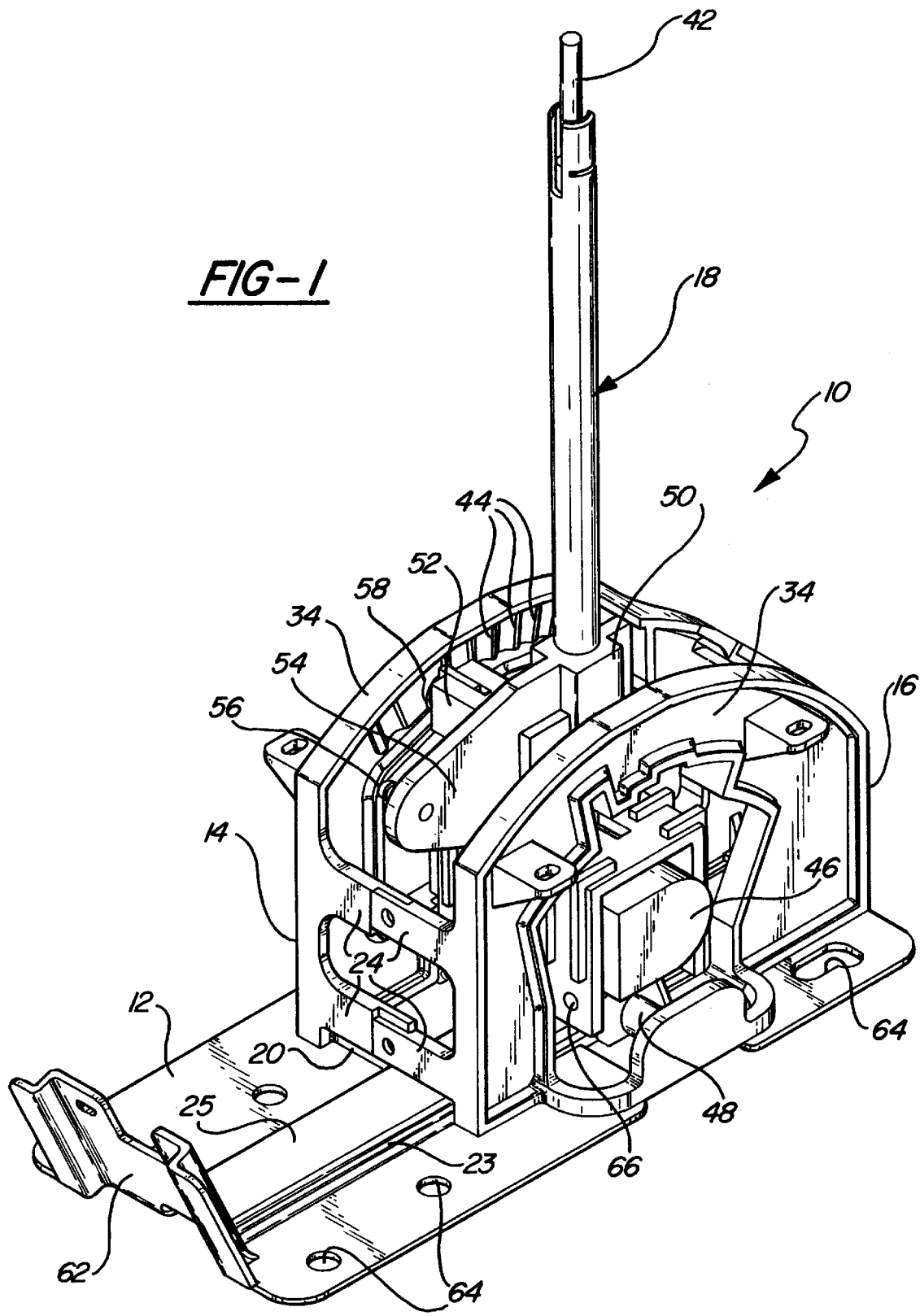
FIG. 1 is a perspective view of a first embodiment of the subject invention.
Figure 2:
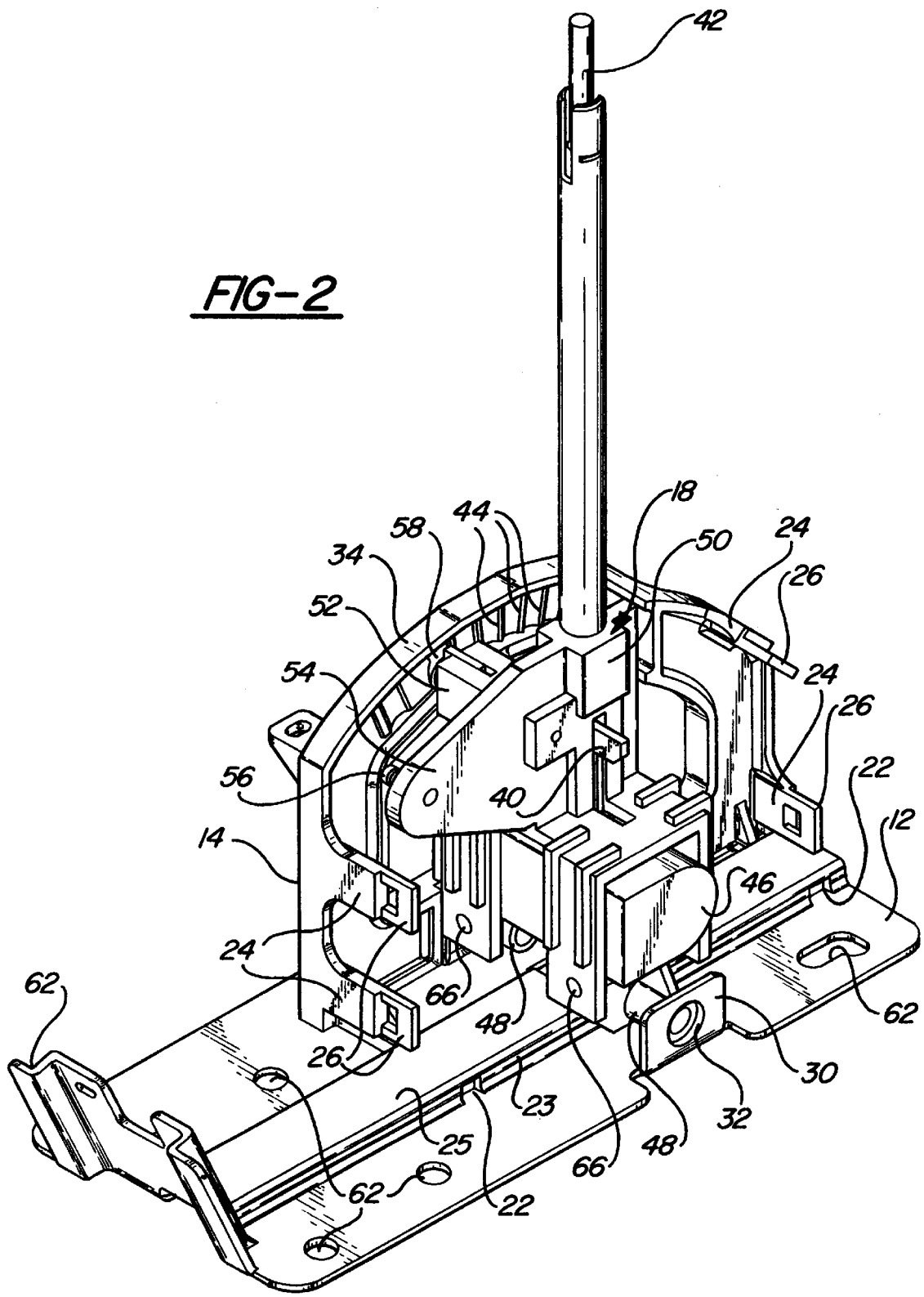
FIG. 2 is a perspective view like FIG. 1 but with a gate side component removed.
Figure 3:
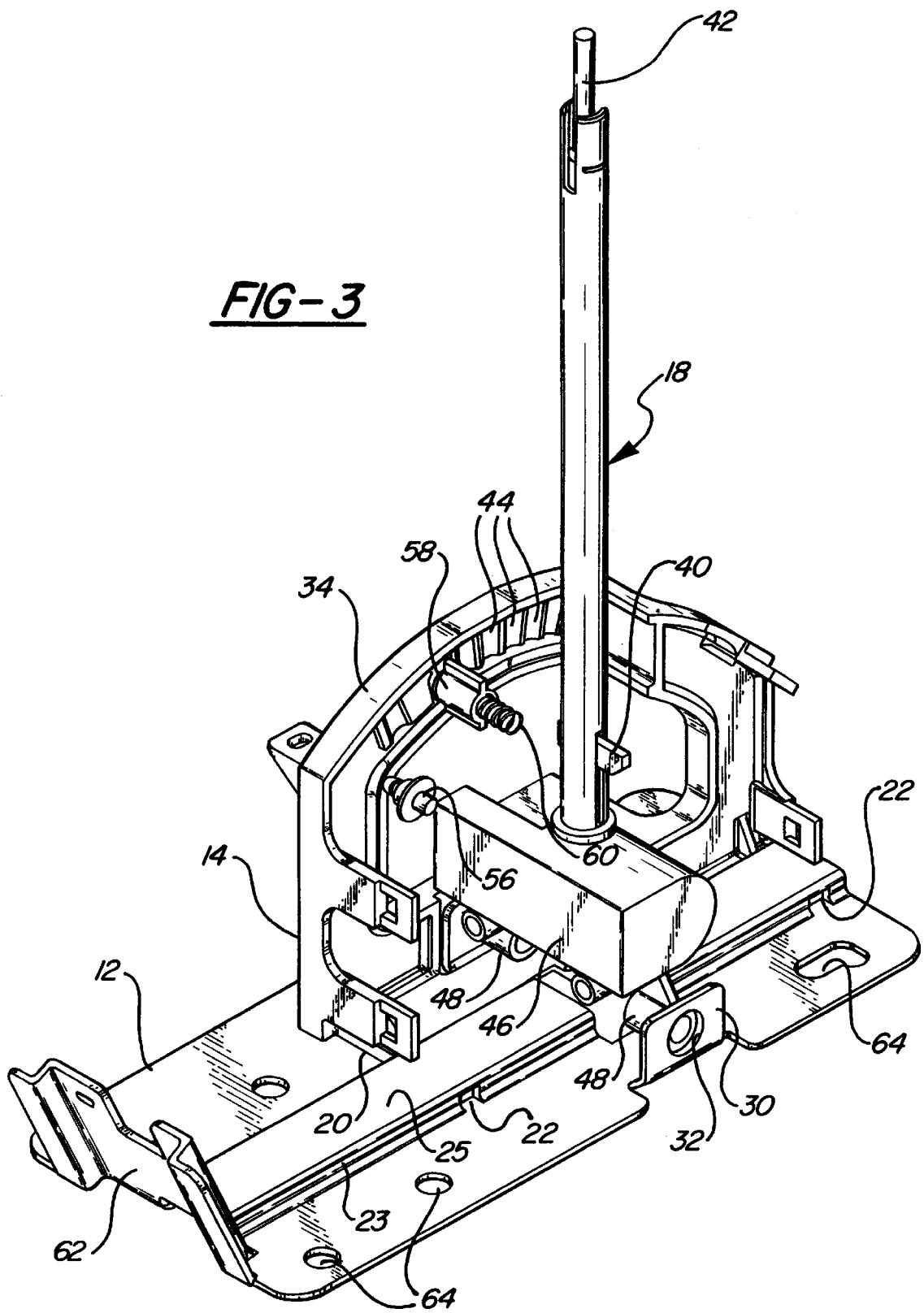
FIG. 3 is a perspective view like FIG. 2 but with the bracket of the lever subassembly removed.
Figure 4:
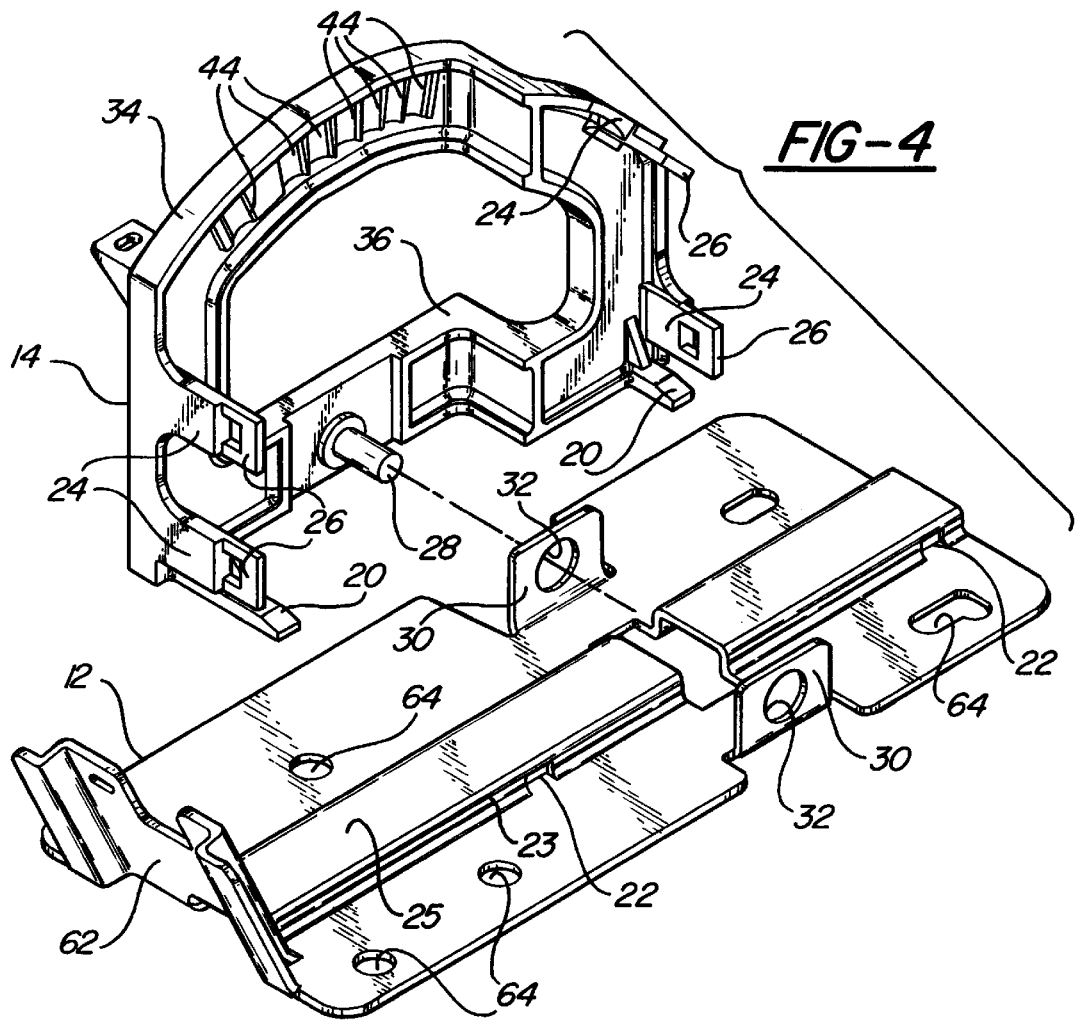
FIG. 4 is an exploded perspective view of the detent side component and the base component.
Figure 5:
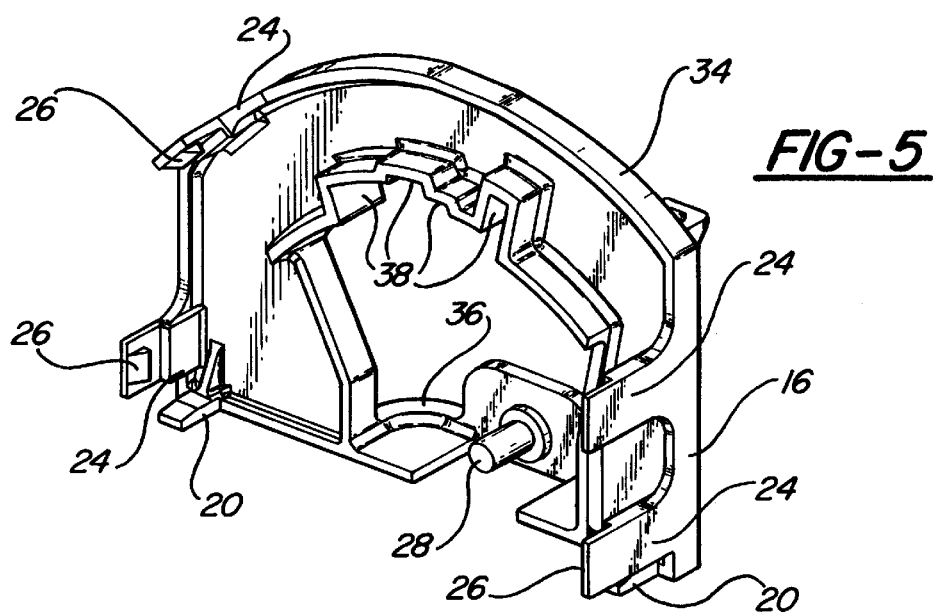
FIG. 5 is a perspective view in the opposite direction of the inside of the gate side component; nd

Referring to the Figures, wherein like numerals indicate like or corresponding parts throughout the several views, a modular single lever shift assembly constructed in accordance with the subject invention is generally shown at 10 in FIG. 1. As illustrated more clearly in the remaining figures, the assembly 10 includes three basic components; a base component 12 for attachment to a vehicle, a first or detent side component 14 extending from said base, and a second or gate side component 16 extending from the base component 12 and spaced from the first side component 14. The components 12, 14 and 16 are separate and independent from one another and consist of an organic polymeric material, i.e., plastic.

A lever subassembly, generally indicated at 18, is pivotally supported between the side components 14 and 16 for pivotal movement between shift positions.

The assembly 10 is characterized by integral connections for connecting the components 12, 14 and 16 together. In one instance, the integral connections comprise male projections 20 extending from the side components 14 and 16 and female openings 22 in the base component 12 for receiving the male projections 20. Since the first side component 14 and the base component 12 consist of organic polymeric material, the male projections 20 may be fused by heating and cooling into the base component 12 around the female openings 22. More specifically, the base component 12 has a channel defined by side walls 23 interconnected by a top 25 and extending between the ends thereof and the female openings 22 extend laterally into the side walls 23. In another instance, the integral connections comprise cantilevered male projections 24 extending laterally from the side components 14 and 16 and into overlapping portions with the snap-together connections 26 disposed in the overlapping portions for holding the side components 14 and 16 together. The snap-together connections 26 include female recesses or openings in the overlapping portions of the cantilevered male projections 24 from the detent side component 14 and male ramps on the overlapping portions of the cantilevered male projections 24 from the gate side component 16.

Each of the side components 14 and 16 includes an integral stub shaft 28 extending toward the other stub shaft 28, the lever subassembly 18 being pivotally supported on the stub shafts 28 between the side components 14 and 16 for pivotal movement between shift positions. The base component 12 includes a pair of laterally spaced and upwardly extending flanges 30 having holes 32 therein and the stub shafts 28 extend through the holes 32 in the flanges 30.

Each of the side components 14 and 16 includes an open space defining an upper arch 34 above the open space and a lower bridge 36 below the open space. The lower bridge 36 of each side component is disposed laterally outwardly of the vertical plane of the associated arch 34 of that side component and the stub shafts 28 extend latterly inwardly from the lower bridge 36.

The arch 34 of the second or gate side component 16 includes a plurality of gates 38 along the top of the open space therein and the lever subassembly 18 includes a pawl 40 for movement between and retention in the gates 38. The pawl 40 is actuated by a button 42, or the like, on the top of the lever subassembly 18 for shifting between gears or transmission positions, as is well known in the art. In a similar fashion, the embodiment of FIGS. 1 through 5 includes a plurality of detents 44 formed integrally on the inside of the arch 34 of the first or detent side component 14.

The lever subassembly 18 includes a housing 46 having depending sleeves 48 which are rotatably supported on the stub shafts 28 and a bracket member 50 attached to the housing 46. The housing 46 and the bracket member 50 also consist of organic polymeric material. The bracket member 50 includes a detent support 52 facing the detents 44 in the arch 34 of the first or detent side component 14 and a cable arm 54 extending parallel to the side components 14 and 16. The cable arm 54 includes a stud 56 to which is attached a control cable for linear movement. A detent finger or roller 58 is supported by the detent support 52 and a biasing means comprising a spring 60 biasing or urging the detent finger 58 into engagement with the detents 44. Therefore, a detent mechanism comprising the detents 44, the detent support 52, the detent finger 58 and the spring 60, interconnects the lever subassembly 18 and the first or detent side component 14 for holding the lever subassembly 18 in anyone of various detent positions.

Figure 6:
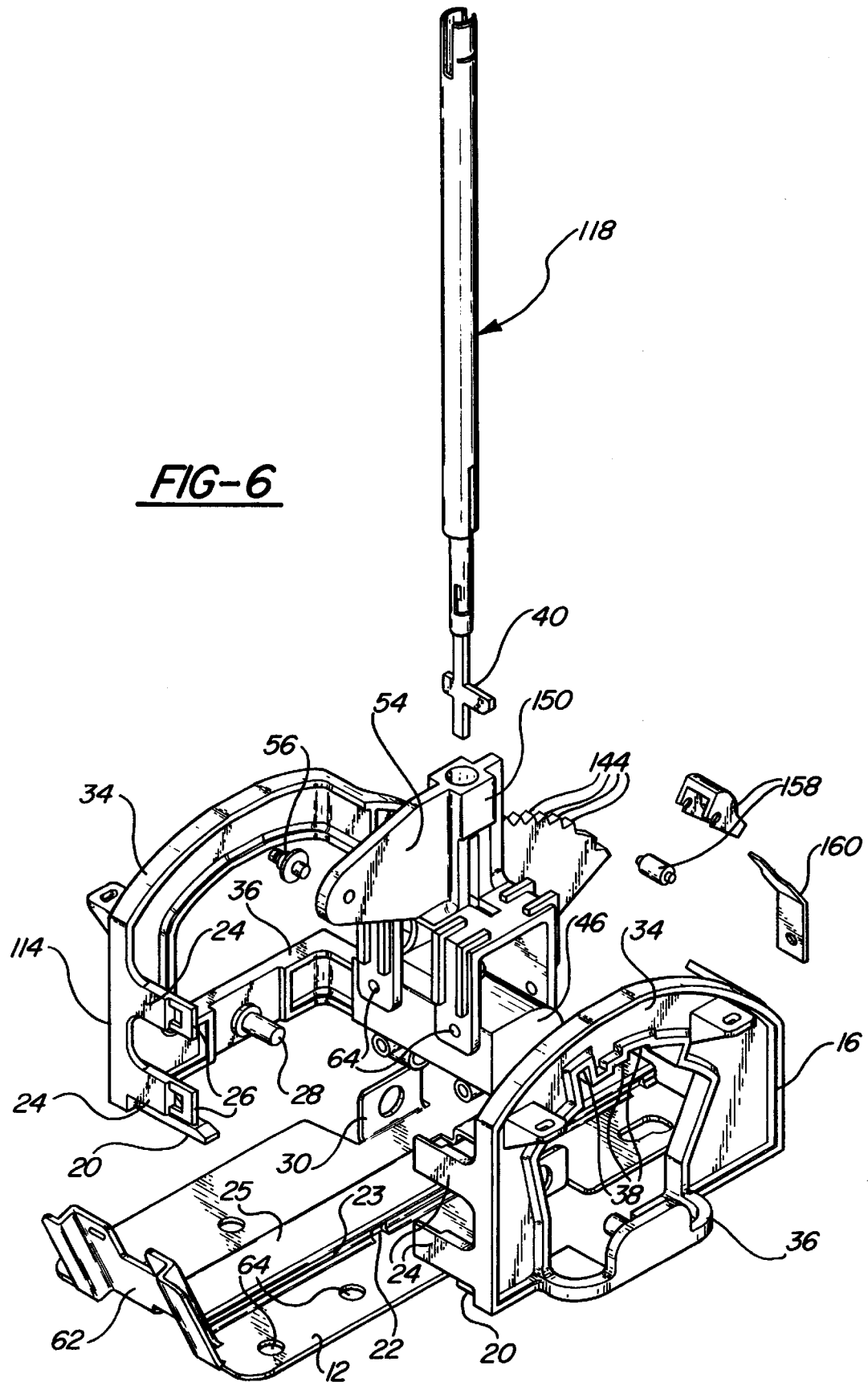
FIG. 6 is an exploded perspective view of a second embodiment of the subject invention.

The embodiment of FIG. 6, wherein like structure is indicated with the same numerals as the in the first embodiment and equivalent structure is indicated with like numerals increased by one hundred, differs from the first embodiment by the detent mechanism. The detent mechanism in FIG. 6 includes a plurality of detents 144 in a fan shaped flange supported by the lever subassembly 18 and a detent finger or roller 158 supported by one of the side components 14 and 16 and biased into engagement with the detents 144 by a spring arm 160. Of course, the first side component 114 of the embodiment of FIG. 6 does not include the integral detents in the arch thereof.

The base component 12 has a front flange 62 and a plurality of mounting holes 64 for attaching the base component 12 to the vehicle. The bracket member 50 is generally U-shaped for disposition over the housing 46 and includes apertures 66 at the distal ends of the legs of the U-shape for receiving fasteners to tighten the legs against the housing 46.

As will be appreciated, from the foregoing description, the components are made of plastic, although in some instances the base component 12 may be made of plastic, and are easily assembled without fasteners as they are snapped together and or heat fused together. In addition, the components may be combined in deferent combinations for different vehicle models thereby having universal components from model to model.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A modular transmission shift assembly comprising;
   a base component (12) for attachment to a vehicle,
   a first side component (14) extending from said base,
   a second side component (16) extending from said base component (12) and spaced from said first side component (14),
   a lever subassembly (18) pivotally supported between said side components for pivotal movement between shift positions,
   said assembly characterized by integral connections for connecting said components base component (12) said first side component (14) and said second side component (16) together,
   said components being separate and independent from one another,
   said integral connections including snap-together connections between said side components (14 and 16) for holding said side components together.

2. An assembly as set forth in claim 1 wherein said integral connections include male projections (20 or 24) and female openings (22) for receiving said male projections (20 or 24).

3. An assembly as set forth in claim 1 wherein said side components (14 and 16) consist of an organic polymeric material.

4. An assembly as set forth in claim 3 wherein said integral connections include male projections (20) extending from said side components (14 and 16) and female openings in said base components (12).

5. An assembly as set forth in claim 4 wherein said base component (12) consists of organic polymeric material and said male projections (20) are fused into said base components (12) around said female openings.

6. An assembly as set forth in claim 5 including cantilevered male projections (24) extending laterally from said side components (14 and 16) and into overlapping portions with said snap-together connections disposed on said overlapping portions.

7. An assembly as set forth in claim 3 wherein each of said side components (14 and 16) includes an integral stub shaft (28) extending toward the other stub shaft (28), said lever subassembly (18) being pivotally supported on said stub shafts (28) between said side components (14 and 16) for pivotal movement between shift positions.

8. An assembly as set forth in claim 3 including a detent mechanism interconnecting said lever subassembly (18) and said first side component (14) for holding said lever subassembly (18) in anyone of various detent positions.

9. An assembly as set forth in claim 8 wherein said detent mechanism includes a plurality of detents formed integrally in said first side component (14) and a detent finger (58) supported by said lever subassembly (18) and biased into engagement with said detents.

10. An assembly as set forth in claim 8 wherein said detent mechanism includes a plurality of detents supported by said lever assembly (18) and a detent finger (58) supported by one of said side components (14 and 16) and biased into engagement with said detents.

11. An assembly as set forth in either 9 or 10 wherein said detent finger (58) includes a roller and a spring urging said roller into engagement with said detents.

12. A modular transmission shift assembly comprising;
    a base component (12) for attachment to a vehicle
    a first side component (14) extending from said base,
    a second side component (16) extending from said base component (12) and spaced from said first side component (14),
    a lever subassembly (18) pivotally supported between said side components for pivotal movement between shift positions,
    said assembly characterized by integrally formed connections for connecting said first side component (14), said second side component (16) and said base component (12) together,
    said components being separate and independent from one another,
    wherein each of said side components (14 and 16) includes an integrally formed stub shaft (28) extending toward the other stub shaft (28), said lever subassembly (18) being pivotally supported on said stub shafts (28) between said side components (14 and 16) for pivotal movement between shift positions, said base component (12) including a pair of laterally space and upwardly extending flanges (30) having holes (32) therein, said stub shafts (28) extending through said holes (32) in said flanges (30).

13. A modular transmission shift assembly comprising:

a base component (12) extending between ends for attachment to a vehicle, said base component (12) having a channel defined by side walls (23) interconnected by a top (25) and extending between the ends thereof, a first side component (14) consisting of organic polymeric material and extending from said base, a first stub shaft (28) integrally formed with and extending inwardly from said first side component (14), a second side component (16) consisting of organic polymeric material and extending from said base and spaced from said first side component (14), a second stub shaft (28) integrally formed with and extending inwardly form said second side component (16), said side components (14 and 16) being separate and independent from one another, a lever subassembly (18) pivotally supported by said stub shafts (28) between said side components (14 and 16) for pivotal movement between shift positions, said channel having a female openings (22) in said side walls (23) and said side components (14 and 16) having male projections (20 or 24) secured in said openings (22) for retaining said base component (12), said first side component (14), and said second side component (16).

14. An assembly as set forth in claim 13 including cantilevered male projections (24) extending laterally from said side components (14 and 16) and into overlapping portions and snap-together connections disposed on said overlapping portions for interconnecting said side components (14 and 16).

15. An assembly as set forth in claim 14 wherein said base component (12) includes a pair of laterally spaced and upwardly extending flanges having holes therein, said stub shafts (28) extending through said holes in said flanges.

16. An assembly as set forth in claim 15 wherein each of said side components (14 and 16) includes an open space defining an upper arch (34) and a lower bridge (36).

17. An assembly as set forth in claim 16 wherein said lower bridge (36) of each side component is disposed laterally outwardly of said arch (34) of the respective side component, said stub shafts (28) extending latterly inwardly from said lower bridge (36).

18. An assembly as set forth in claim 17 wherein said arch (34) of said second side component (16) includes a plurality of gates (38) along the top of said open space therein and said lever subassembly (18) includes a pawl (40) for movement between and retention in said gates (38).

19. An assembly as set forth in claim 18 including a detent mechanism interconnecting said lever subassembly (18) and said first side component (14) for holding said lever subassembly (18) in anyone of various detent positions.

20. An assembly as set forth in claim 19 wherein said detent mechanism includes a plurality of detents supported by said lever subassembly (18) and a detent finger (58) supported by one of said side components (14 and 16) and biased into engagement with said detents.

21. An assembly as set forth in claim 19 wherein said detent mechanism includes a plurality of detents supported by said lever subassembly (18) and a detent finger (58) supported by one of said side components (14 and 16) and biased into engagement with said detents.

22. An assembly as set forth in either claim 20 or 21 wherein said detent finger (58) includes a roller and a spring urging said roller into engagement with said detents.

23. An assembly as set forth in claim 18 wherein said lever subassembly (18) includes a housing (46) rotatably supported on said stub shafts (28) and a bracket member (50) attached to said housing (46), said bracket member (50) including a detent support (52) facing said first side component (14) and cable arm (54) extending parallel to said side components (14 and 16), said first side component (14) having a plurality of detents formed integrally in said first side component (14), and a detent finger (58) supported by said detent support (52), and biasing means for biasing said detent finger (58) into engagement with said detents.

24. An assembly as set forth in claim 23 wherein said housing (46) and said bracket member (50) consist of organic polymeric material.

* * * * *